April 23, 1968      R. F. GERHARDT      3,379,559

GLASS CONTAINER HAVING METAL OXIDE AND RESIN COATINGS

Filed Dec. 20, 1963

INVENTOR
ROBERT FRANK GERHARDT
BY
*Robert P. Auber*
ATTORNEY

United States Patent Office 3,379,559
Patented Apr. 23, 1968

3,379,559
GLASS CONTAINER HAVING METAL OXIDE AND RESIN COATINGS
Robert Frank Gerhardt, Deer Park, N.Y., assignor to American Can Company, New York, N.Y., a corporation of New Jersey
Filed Dec. 20, 1963, Ser. No. 332,064
11 Claims. (Cl. 117—72)

ABSTRACT OF THE DISCLOSURE

A glass container having on its exterior surface an adherent coating of a metal oxide over which metal oxide coating is adhered a synthetic resin coating or decoration and a method of producing this article.

---

Figure 1:
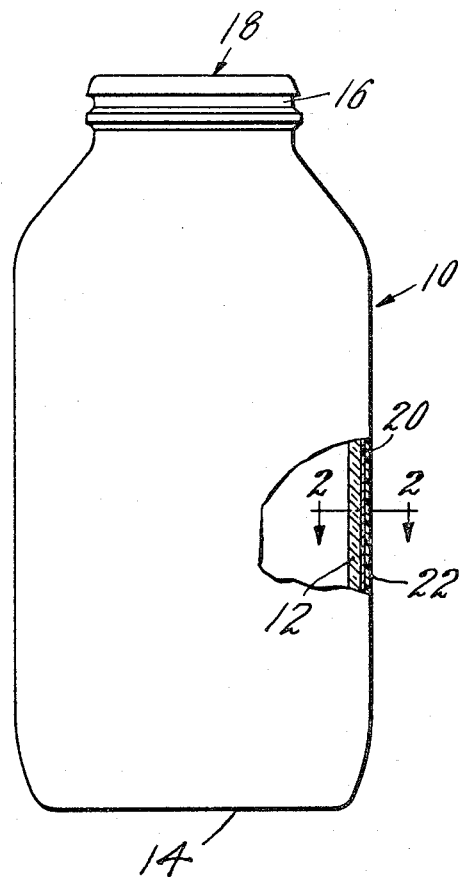

The present invention relates to a glass container having an adherent organic coating thereon. More specifically, the invention relates to a glass container having a particular epoxide-phenolic-vinyl resin coating tenaciously adhered to its exterior surface by means of a metal oxide deposit on the surface of the container and the method of producing this container.

Exterior coatings on glass containers or bottles, particularly bottles which during the packing thereof are subjected to various types of water treatments, must be able to withstand many treatments which tend to destroy, degrade or loosen the coating from the bottle. For example, in the packaging of beer, many States require a rather severe alkali washing of the bottles prior to filling. A rather limited class of resins are capable of withstanding attack by this caustic alkali.

Also, the packaging of a great variety of food products in glass containers requires prolonged immersion or contact with water, both hot and cold, often in rapid sequence. Further, consumers in their use of these products often immerse them in water, occasioning rapid changes in temperatures, e.g. immersing bottled beer or soft drinks in ice water after they have been exposed to summer temperatures for some time. Such immersion results in very severe adhesion-loss of organic coatings applied to the surface of the container.

Resinous exterior coatings on glass containers must also be quite hard and mar resistant since these exterior surfaces are usually subjected to extensive abrasion during handling of the containers.

It is therefore an object of the present invention to provide a glass container having a coating thereon which is adherent, inert and mar resistant.

Another object is to provide a glass container having an exterior resinous coating thereon which coating requires a relatively short curing time to reach an inert, mar resistant condition.

A further object is to provide a glass container having an exterior resinous coating which coating is resistant to attack by hot caustic and abrasion, and adheres tenaciously to the glass surface through repeated submersions in water, both hot and cold, and through rapid temperature changes.

Still another object is to provide a method for providing a glass container with an adherent, inert, mar resistant resinous coating on its exterior surface.

Numerous other objects and advantages of the invention will be apparent as it is better understood from the following description, which, taken in connection with the accompanying drawing, discloses a preferred embodiment thereof.

The above objects are accomplished by forming, by means of a highly efficient procedure, a metal oxide on the exterior surface of a glass container and thereafter coating this surface with a cured resinous composition comprising a particular epoxide resin, a particular polymethylol resin and at least one vinyl resin. The metal oxide forms an anchoring or bonding agent between the exterior surface of the container and subsequently applied resin coating; and the cured coating provides a mar resistant, inert film over the bottle exterior.

While not wishing to be bound by any particular theory, it is believed that there is present on the bottle surface OH or ONa groups; and that these groups dissociate from the glass when contacted with water which has permeated an organic, resinous film on the bottle surface causing the film to lose its adhesion to the surface. During the deposition of the metal oxide on the container exterior the potentially dissociable groups thereon are removed or inactivated in some manner, probably by a hydrolysis reaction with the oxide-forming compound. The metal oxide forms on and adheres to the glass surface in a multitude of connected, tiny nodules. These nodules are not hydrophilic but organophilic and provide anchoring areas to which the subsequently applied organic resin coating can firmly attach itself.

Figure 2:
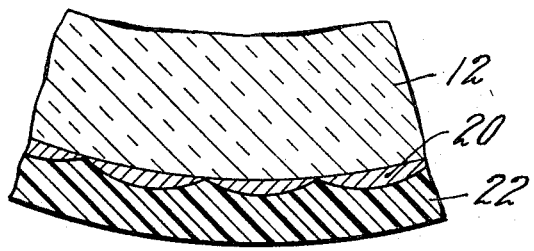

Referring to the drawing:

FIG. 1 is a side elevational view of a coated glass container with parts broken away and partly in section; and FIG. 2 is an enlarged sectional fragmentary view taken substantially along lines 2—2 of FIG. 1.

As a preferred or exemplary embodiment of the instant invention, the figures show a cylindrical one-piece glass bottle generally designated 10. The bottle 10 has a body 12 having an integral end closure 14 at its bottom end. The body 12 towards its upper end tapers inwardly to form a neck finish 16 which surrounds an open mouth 18. The finish 16 is adapted to receive and retain, after the bottle is filled, a cap or closure (not shown).

Attached to the exterior surface of the bottle is a plurality of metal oxide nodules 20 (FIG. 2). The size of these nodules in relation to the bottle is greatly exaggerated for the purpose of illustration. In actuality, the bottle has on its surface a continuous deposit of from about from $1 \times 10^{-5}$ to $10 \times 10^{-5}$, and preferably about from $1 \times 10^{-5}$ to $2 \times 10^{-5}$ gm. of oxide per sq. in. To provide an anchoring agent for the resin coating in accordance with the instant invention, the oxide deposit must be continuous. Deposits less than about $1 \times 10^{-5}$ gm./in.$^2$ fail to provide consistently the necessary continuity.

Covering the oxide deposit including the nodules 20 is a resinous, preferably colored, coating 22. The coating 22 covers the entire outside of the bottle 10 from the finish 16 down to and including the end closure 14. It is to be understood that the coating 22 may cover all or any portion of the outside surface of the bottle 10; but it is preferred that it cover at least a predominate portion of the bottle body 12.

The metal oxide is deposited on the outside of the bottle 10 according to the method set forth in copending application Ser. No. 231,642 filed Oct. 19, 1962 and owned by the instant assignee. In general, this procedure is as follows: After blow molding, the bottle 10 is placed on a conveyor, open end up, and transported toward the annealing lehr. During the continuous travel of the bottle 10, a heated mixture of a vapor of a volatile metallic compound and a substantially anhydrous carrier gas is jetted or blown over the exterior surface of the bottle with a vapor-glass relative velocity of from 100 to 1,000 ft./min. and preferably about 600 to 700 ft./min. while the contacted surface is at a temperature above the dew point of the mixture, usually in the neighborhood of about 500° F. By dew point is meant that temperature at which solid or liquid metallic treating compound will condense from the gaseous mixture. Upon contact with the glass surface, this compound reacts, probably by hydrolysis, to form and deposit on the bottle surface the metal oxide nodules 20. Although the glass surface temperature does not appear to be critical—provided it is above the dew point of the gaseous mixture—a relatively fast rate of deposition of the oxide on the surface is necessary in order to produce the desired amount of oxide on the surface in a commercially feasible time interval, 0.1 to 3 secs. and preferably about 0.3 sec. The oxide deposition rate must be at least $0.5 \times 10^{-5}$ gm. of oxide per sec. per sq. in. of surface, and preferably from $1 \times 10^{-5}$ to $10 \times 10^{-5}$ gm./sec./in.$^2$. The thus treated bottle continues its travel on the conveyor to the annealing lehr wherein the strains are removed from the glass in a well-known manner. The bottle 10 is then conveyed by suitable means to the coating operation.

The volatile metallic compounds most suitable for the production of the metal oxide nodules 20 are organic and inorganic compounds of titanium and zirconium which are hydrolyzable and exhibit an appreciable vapor pressure, i.e. at least 0.1 mm. of mercury, at a temperature below their decomposition temperature. Compounds within this class are alkyl titanates such as tetraisopropyl titanate (TPT), alkyl zirconates such as tetra-t-butyl zirconate, titanium tetrachloride and zirconium tetrachloride. The metallo-organic esters or mixtures thereof, and specifically TPT are preferred. In the instant embodiment of the invention, a gaseous mixture containing $0.3 \times 10^{-5}$ to $2 \times 10^{-5}$ and usually about $1 \times 10^{-5}$ gm. TPT per ml. of dry nitrogen is supplied to the bottle surface at a rate of from 5 to 15 cu. ft. per minute and preferably about 10 c.f.m. This TPT reacts to form the nodules of titanium dioxide on the glass surface. Dry air may be substituted for the dry nitrogen; and if a source of dry air is readily available, it may be preferred to the nitrogen for economic reasons.

The epoxide resin component of the subject coating is an epoxidized polybutadiene which is formed by oxidizing in solution a polybutadiene having an absolute viscosity of about 1,500 cps. at 100° F. with a peracid. The absolute viscosity of a polybutadiene at a given temperature is a conventional method of designating the degree of polymerization or average molecular weight of the polymer. For the purpose of the instant invention 1,500 cps. at 100° F. describes the preferred polybutadiene. However, it is to be understood that polybutadienes having a somewhat higher or lower molecular weight as evidenced by a somewhat higher or lower absolute viscosity respectively may also be used.

The epoxide group is introduced into the polybutadiene chain by means of organic peracids, usually aliphatic peracids such as peracetic acid or performic acid. This reaction usually takes place in a solvent for the polybutadiene and peracid such as toluene and at elevated temperatures, e.g. about 60° C., and in the presence of a suitable catalyst such as sulphuric acid. The amount of epoxidization of the polybutadiene or quantity of oxirane oxygen introduced into the polybutadiene chain will depend upon the percentage of the stoichiometric quantity of epoxidizing peracid reacted with polybutadiene. For use in the instant invention the epoxidized polybutadiene contains from about 4 to 8% and preferably about 6% oxirane oxygen, i.e. 4 to 8 and preferably 6 gram-mols of oxirane oxygen per 100 gram-mols of epoxidized resin. To obtain about 6% of oxirane oxygen, an amount of peracids in the order of magnitude of 50% of the stoichiometric amount is reacted with the polybutadiene.

The following is an idealized structural formula of the preferred epoxidized polybutadiene from peracetic acid and butadiene-1,4 having utility in the instant coating.

wherein X is a number whole or fractional, between 2 and 5. Although not shown in this idealized structural formula, the greatest percentage of molecules of the epoxidized polybutadiene useful in the instant invention have terminal oxirane groups. This epoxide resin composes about from 40 to 50% by weight, and preferably about 47% by weight of the resinous ingredients in the composition.

The polymethylol resin component for reaction with the epoxidized butadiene resin is an A-stage, i.e. soluble and fusible, condensation product of formaldehyde and phenol. It contains a plurality of reactive hydroxyls which enable it to react with the epoxide groups of the epoxide resin leading to a three-dimensional thermoset condition. These properties of the polymethylol resin endow it with a high degree of reactivity with the epoxide resin; and in the cured state the resulting film has a high degree of mar and chemical, e.g. alkali, resistance. To provide the cured film 22 with its necessary properties, the polymethylol resin is present in the composition in an amount of about from 4 to 8% by weight, and preferably about 6% by weight, of the resinous ingredients.

The phenol-formaldehyde resins useful in the instant invention are those disclosed in U.S. Patent 2,579,330. In general, these resins are the alkenyl or halogenated alkenyl ethers of a polymethylol phenol. Specifically preferred is 1-allyloxy-2,4,6-trimethylol benzene.

The subject coating contains as its vinyl resin component at least an interpolymer of about 86% vinyl chloride, about 13% vinyl acetate and about 1% maleic acid or maleic anhydride, the former being preferred. This vinyl interpolymer is well known in the art and one such is sold commercially under the designation Vinylite VMCH. This vinyl interpolymer improves the toughness, inertness and impermeability of the subject coating, probably by having its free carboxyl groups react with the functional groups of either the epoxide resin or polymethylol resin or both.

The vinyl resin constitutes about from 40 to 50% and preferably about 47% by weight of the resinous ingredients in the coating. As indicated above, this quantity of vinyl resin may be composed completely of the vinyl chloride-vinyl acetate-maleic acid interpolymer. However, such a composition is quite reactive and tends to gel upon standing for some days. To provide the coating with an extended pot life more suitable to commercial operations, it is preferred to combine with the vinyl interpolymer a copolymer of vinyl chloride and vinyl acetate which has been hydrolyzed to provide the copolymer with from 2 to 20% by weight of combined vinyl alcohol. This vinyl resin is also well known in the art and one such resin is sold commercially under the designation Vinylite VAGH. It is preferred that in the subject coating the vinyl interpolymer and hydrolyzed vinyl copolymer be present in a weight ratio of from 9/1 to 1/2 respectively. A 1/1 weight ratio has been found most effective.

The coloring agent to be added may take the form of a solid, non-volatile pigment; or may be in the form of a soluble dye. The amount of coloring matter added will depend upon the intensity of color desired and type of coloring matter used. Broadly, this amount will be in the range of, by weight, from 1.0 to 15.0 parts per part of polymethylol resin. Generally, soluble dyes will be used in lesser amounts than the insoluble pigments.

The subject composition is applied to the exterior surface of the glass bottle as a liquid. Any one of a number of volatile organic solvents can be used to provide a liquid vehicle or carrier for the non-volatile solids. For reasons of economics, it is preferred to use as high

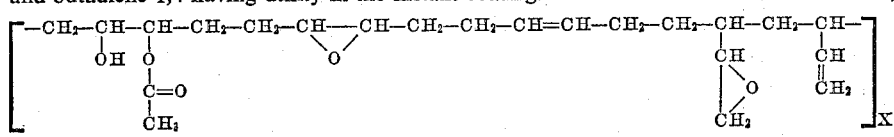

a percentage of mononuclear aromatic hydrocarbons, e.g. benzene, toluene and xylene, as possible while maintaining the viscosity and resin solubility of the composition at an operable level. To provide the coating solution with the desired viscosity, and also with other desired properties such as improved flow-out, controlled evaporation and the like, other selected volatile organic liquids such as lower alkyl alcohols, e.g. butanol, lower ether alcohols such as 2-methoxy-ethanol, lower alkyl esters, and ethers of diethylene glycol such as diethylene glycol monobutyl ether, may be used alone or in admixture with the aromatic hydrocarbon solvents. These additional solvents are added in varying amounts depending upon the results desired.

In coating and decorating the glass bottle 10 in accordance with the instant invention, the coating 22 is applied to the exterior of the bottle by any suitable means such as by dipping or spraying. In certain instances a decorative label or indicia will be applied over the coating 22. Usually in such instances, the coating 22 will be dried only enough to make it tack-free so that the indicia may be applied thereover. A bake of approximately five minutes at 380° F. will produce such a tack-free condition. Thereafter the two coatings will be cured simultaneously by baking for about from 8 to 15 minutes and preferably about 10 minutes at a temperature of about from 380° F. to 430° F., and preferably about 400° F. If, however, no subsequent indicia is to be applied to the coating 22, after initial application it can be cured by a single bake at the specified time and temperature. It is to be understood that this time-temperature relationship can be varied slightly, such as by lengthening the time and lowering the temperature or vice-versa or by adding accelerators. Further, undercuring of the resin composition results in a coating which is soft and does not have the necessary mar and abrasion resistance; whereas overcuring produces a brittle coating. After cooling of the heat cured film, a solid chemically resistant, higher adherent, color-fast, outer coating 22 for the bottle is obtained.

The following examples are by way of explanation and are not to be considered limitations on the invention.

Example I

A flint glass bottle approximately 5½ in. high by 2¾ in. maximum diameter and having the shape shown in the drawing was formed by press and blow molding a glass slug maintained above its deformation temperature. After removal from the molding station this bottle was exposed to the atmosphere for about 10 seconds to enable it to cool, at least externally, below its deformation temperature and then placed on a conveyor open end up to transfer it to an annealing lehr. During its continuous travel to the annealing lehr its exterior surface had a gaseous mixture of TPT vapor and dry air blown thereover at a relative velocity of gas to glass of about 650 ft./min. The gas has a temperature of about 150° F. and a TPT concentration of about $1 \times 10^{-5}$ gm./ml. of gas. As near as can be determined, the bottle surface had a temperature in the neighborhood of 500° F. during contact with the treating gas. This contact continues for about 0.3 sec. whereby substantially the entire exterior surface of the bottle has formed thereon a continuous deposit of titanium dioxide in an amount of about $2 \times 10^{-5}$ gm./in.² The thus treated bottle is then placed in the annealing lehr and subjected to controlled heating and cooling over a period of about 75 minutes to remove strains therefrom.

Example II

PART A

| Ingredient: | Quantity (lbs.) |
| --- | --- |
| Preferred epoxidized polybutadiene | 160.5 |
| 1-allyloxy-2,4,6-trimethylol benzene | 24.1 |
| Solvesso 150 (xylol and higher homologues) | 16.0 |
| $TiO_2$ | 241.0 |

PART B

| Ingredient: | Quantity (lbs.) |
| --- | --- |
| Vinylite VAGH | 90.6 |
| Vinylite VMCH | 90.6 |
| Xylene | 36.30 |
| Methyl isobutyl ketone | 181.0 |
| Pentoxone (an aliphatic ketone-ether) | 181.0 |

The ingredients of Part A above are mixed and then ground on a three-roll mill until a uniform substantially homogeneous white pigment paste results. The two Vinylite resins from Part B are mixed in the xylene, MIBK and Pentoxone solvents until dissolved; and thereafter the white pigment paste is blended into this resin solution with a Homomixer. This combination of ingredients produces a slightly off-white coating composition having a viscosity of about 150 secs. #4 Ford Cup at 25° C.

Tinting composition

| Ingredient: | Quantity (lbs.) |
| --- | --- |
| Preferred epoxidized polybutadiene | 21.0 |
| Solvesso 150 | 1.0 |
| Carbon black | 3.0 |

This tinting composition was added to the substantially white coating to produce a coating having a battleship grey color.

This coating is reduced to spray viscosity, i.e. about 25 secs. #4 Ford Cup at 25° C., with methyl ethyl ketone. It is then heated to about 140° F. and sprayed onto the exterior surface of the glass bottles formed in accordance with Example I up to the line at its finish 16. The bottle is then placed in an oven and dried for 10 minutes at 400–410° F. and thereafter cooled. These operations provide the exterior of the bottle 10 with about 19 mgs. of coating per square inch of surface coated. This resin coating 22 can vary in weight from 15 to 25 mgs. per square inch of surface coated.

To test the inertness and adhesion of the exterior resin coating, coated glass bottles produced in accordance with the instant invention were immersed for ten minutes in 3% NaOH solution maintained at 130° F. As controls, bottles having exactly the same exterior resin coating but no metal oxide treatment prior to coating were subjected to the same treatment. Neither the subject bottle nor the controls showed any evidence of softening or loss of adhesion indicating the high degree of resistance and chemical inertness of the resin film. To test for adhesion after prolonged immersion in water and thermal shock, the subject bottles and the controls were submerged in 150° F. water for one hour and then plunged into ice water and permitted to remain for one hour or longer. No loss of adhesion of the resin coating occurred with the instant bottles; but the resin coating on the controls readily peled off from the surface of the bottle.

The resinous coatings disclosed herein were compared to coatings formed from 1,2-epoxide resin, i.e. the reaction product of bisphenol and epichlorohydrin, and a melamine-formaldehyde resin when each coating was applied in the same maner over an oxide coated bottle produced according to Example I. The instant coatings even when having two superimposed decorative ink films showed no tendency to sag when given a final curing bake. Further, the subject coatings showed superior resistance to softening or adhesion loss when subjected to the pasteurization process used in bottling beer.

It is thought that the invention and many of its attendant advantages will be understood from the foregoing description and it will be apparent that various changes may be made in the form, construction and arrangement of the parts and that changes may be made in the steps of the method described and their order of accomplishment without departing from the spirit and scope of the invention or sacrificing all of its material advantages, the form hereinbefore described being merely a preferred embodiment thereof.

I claim:
1. A glass container having over its exterior surface a metal oxide coating and thereover a continuous adherent, mar and alkali resistant organic coating, said organic coating consisting essentially of a heat cured reaction product of by weight:
  (a) from 40 to 50% of an epoxidized polybutadiene;
  (b) from 4 to 8% of an alkenyloxy-polymethylol-benzene; and
  (c) from 40 to 50% of a vinyl resin including an interpolymer of vinyl chloride, vinyl acetate and a compound selected from the group consisting of maleic acid and maleic anhydride.

2. The container set forth in claim 1 wherein said (c) consists of equal parts of said interpolymer and a copolymer of vinyl chloride and vinyl acetate hydrolyzed so as to contain vinyl alcohol.

3. The container set forth in claim 1 wherein said metal oxide is present on said surface in an amount of from $1 \times 10^{-5}$ to $10 \times 10^{-5}$ gm./in.$^2$.

4. The container set forth in claim 3 wherein said metal oxide deposit is continuous and exists in the form of a multitude of individual connected microscopic nodules.

5. The container set forth in claim 4 wherein the metal in said oxide is selected from the group consisting of titanium and zirconium.

6. The container set forth in claim 5 wherein said metal is titanium.

7. A method of coating the exterior surface of a glass container with an alkali resistant, adherent resin comprising the steps of:
  passing said container along a predetermined path of travel between a forming machine therefor and an annealing lehr therefor
  blowing over said surface while said container is passing along said predetermined path of travel a gaseous mixture of a vapor of a hydrolyzable metal compound and a substantially anhydrous gas at a relative velocity of mixture to surface of from 100 to 1,000 ft. per minute for a time of from 0.1 to 3.0 sec. while said surface is above the dew point of said mixture, and depositing an oxide of said metal on said surface at a rate of from $1 \times 10^{-5}$ to $10 \times 10^{-5}$ gm. of oxide per sec. per sq. in. of surface;
  annealing the thus treated container;
  applying to the treated surface of said annealed container a resin mixture of an epoxidized polybutadiene resin, alkenyloxy polymethylol benzene and an interpolymer of vinyl chloride, vinyl acetate and a compound selected from the group consisting of maleic acid and maleic anhydride;
  heating the applied resin mixture at a temperature of about from 380° to 450° F. for from 8 to 15 minutes to cure said resin mixture and firmly bond it to the oxide treated surface; and
  thereafter cooling said cured resin to produce a tough, inert, mar resistant coating on the exterior of said container.

8. The method set forth in claim 7 wherein said velocity is about from 500 to 750 ft. per minute.

9. The method set forth in claim 7 wherein said hydrolyzable compound is tetra-isopropyl titanate.

10. The method set forth in claim 7 wherein said time is about 0.3 second.

11. The method set forth in claim 7 wherein said mixture has a vapor concentration of about from 0.3 to $10^{-5}$ to $2 \times 10^{-5}$ gm. per ml.

References Cited

UNITED STATES PATENTS

| | | | |
|---|---|---|---|
| 2,579,330 | 12/1951 | Martin | 260—613 |
| 2,768,909 | 10/1956 | Haslam | 117—124 X |
| 2,831,780 | 4/1958 | Dreyrup | 117—124 X |
| 2,951,769 | 9/1960 | McKnight | 117—72 |
| 2,963,390 | 11/1960 | Fain et al. | 117—124 X |
| 3,002,854 | 10/1961 | Brill | 117—72 |
| 3,004,863 | 10/1961 | Gray et al. | 117—124 |
| 3,216,848 | 11/1965 | Hart et al. | 117—72 X |
| 3,262,809 | 7/1966 | Aber | 117—72 |

FOREIGN PATENTS 853,847  11/1960  Great Britain.

ALFRED L. LEAVITT, *Primary Examiner.*

RALPH S. KENDALL, *Examiner.*

A. M. GRIMALDI, E. B. LIPSCOMB,
*Assistant Examiners.*